United States Patent
Liu

(10) Patent No.: US 11,144,766 B2
(45) Date of Patent: Oct. 12, 2021

(54) METHOD FOR FAST VISUAL DATA ANNOTATION

(71) Applicant: SONY CORPORATION, Tokyo (JP)

(72) Inventor: Cheng-Yi Liu, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 69 days.

(21) Appl. No.: 16/582,913

(22) Filed: Sep. 25, 2019

(65) Prior Publication Data

US 2021/0089783 A1    Mar. 25, 2021

(51) Int. Cl.
*G06K 9/00*    (2006.01)
*G06T 11/60*    (2006.01)

(52) U.S. Cl.
CPC ..... *G06K 9/00744* (2013.01); *G06K 9/00369* (2013.01); *G06K 9/00765* (2013.01); *G06T 11/60* (2013.01); *G06T 2210/12* (2013.01)

(58) Field of Classification Search
CPC ........... G06K 9/00744; G06K 9/00369; G06K 9/00765; G06T 11/60; G06T 2210/12
See application file for complete search history.

(56) References Cited

U.S. PATENT DOCUMENTS

| | | |
|---|---|---|
| 9,176,987 B1 | 11/2015 | Peng et al. |
| 2019/0073447 A1 | 3/2019 | Guo et al. |
| 2019/0266408 A1* | 8/2019 | Wang ................. G06K 9/00369 |
| 2020/0074678 A1* | 3/2020 | Ning ......................... G06T 7/73 |
| 2020/0143171 A1* | 5/2020 | Lee ..................... G06K 9/00744 |
| 2020/0210706 A1* | 7/2020 | Barzelay ............... G06F 3/0482 |

OTHER PUBLICATIONS

Biresaw,Tewodros et al., "ViTBAT: Video Tracking and Behavior Annotation Tool", IEEE AVSS, Aug. 2016.
Sirnam, Swetha et al., "Efficient Object Annotation for Surveillance and Automotive Applications" Winter Conference on Applications of Computer Vision Workshop, Report No. IIIT/TR/2016/-1, Centre for Visual Information Technology Hyderabad, India, Mar. 2016.

* cited by examiner

*Primary Examiner* — Xin Jia
(74) *Attorney, Agent, or Firm* — Haverstock & Owens LLP

(57) ABSTRACT

Fast visual data annotation includes automatic detection using an automatic detector to detect subjects and joints in video frames. Then, annotation with sampling is performed, including determining when a frame is a sample (e.g., based on comparison of frames). Replay and refinement is utilized where user is involved with manually annotating subjects and/or joints in only select video frames.

15 Claims, 8 Drawing Sheets

Annotation with Sampling
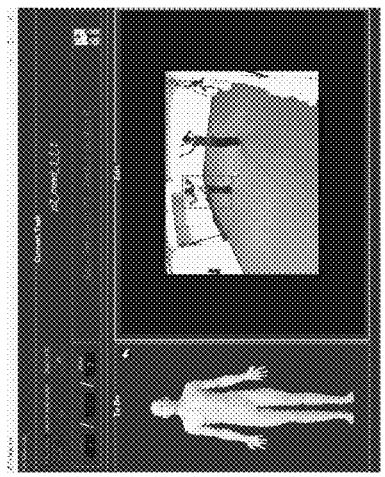
Show the latest patch of the subject 0 on the status bar (samples s-1)
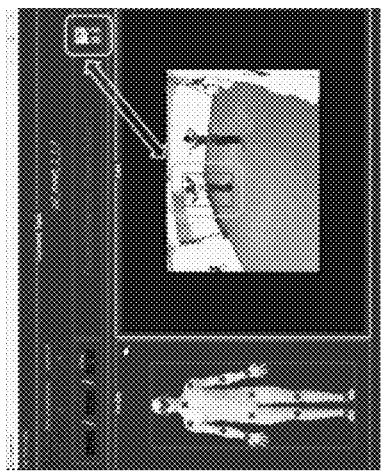
Space press, right click, or left click to start editing subject 0
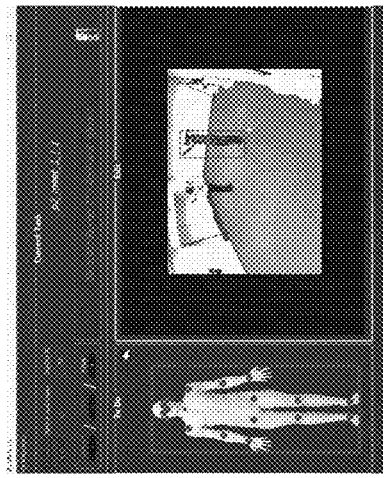
After the subject 0 is completed, will automatically switch to the next subject requiring a sample
Fig. 5

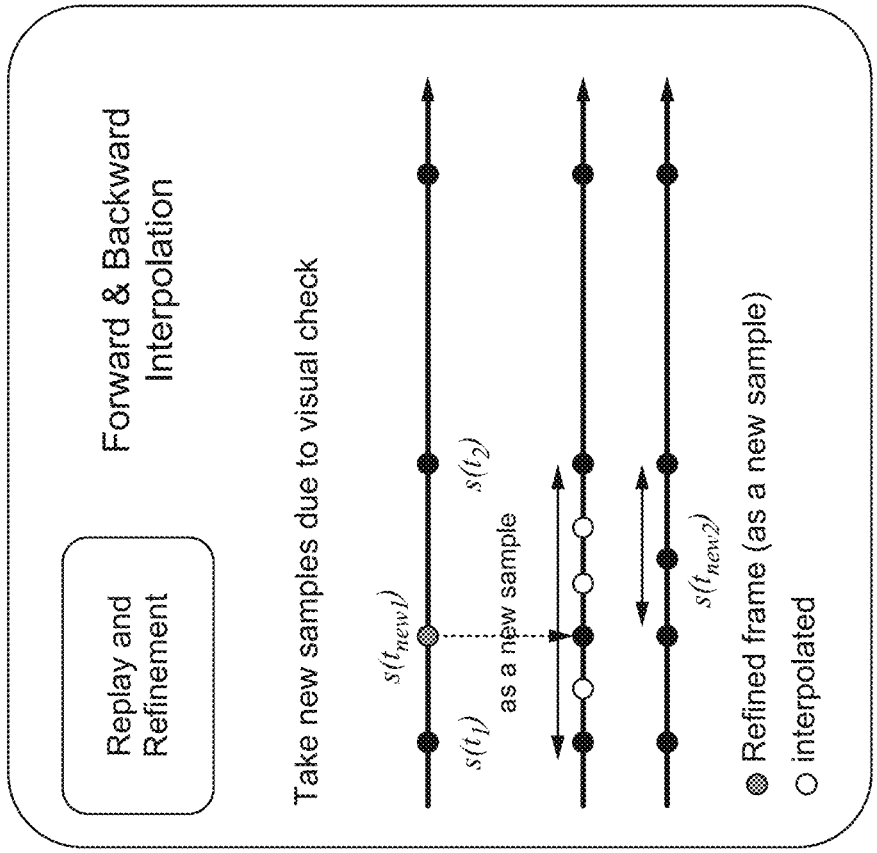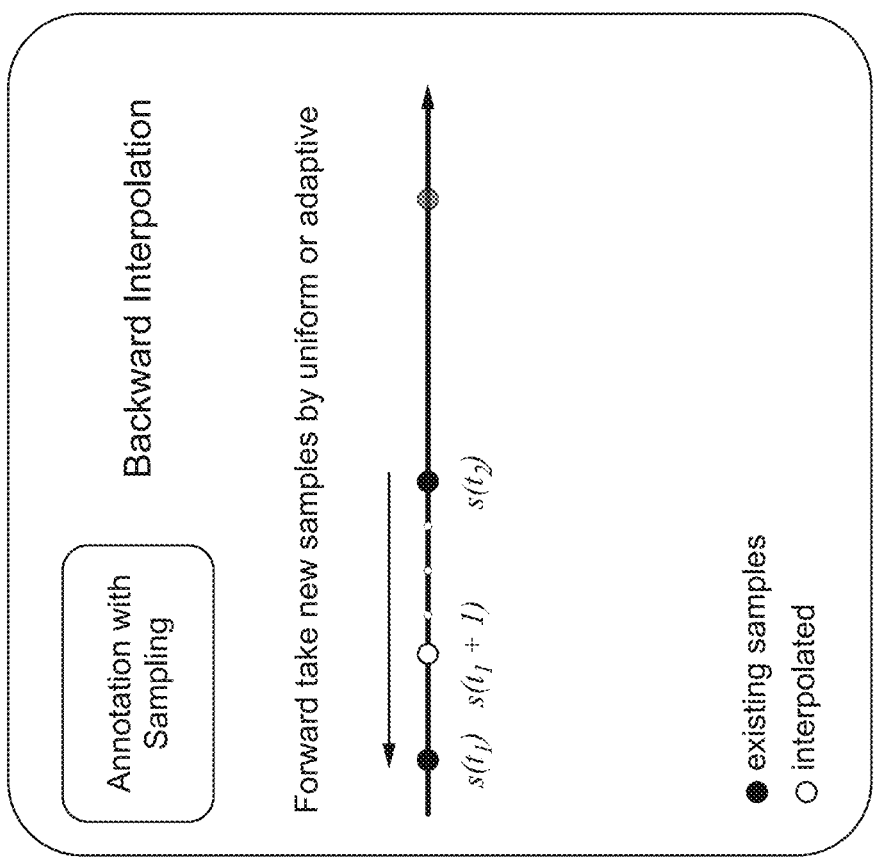
Fig. 6

METHOD FOR FAST VISUAL DATA ANNOTATION

FIELD OF THE INVENTION

The present invention relates to deep learning. More specifically, the present invention relates to data annotation for deep learning.

BACKGROUND OF THE INVENTION

High quality data collection is essential for developing robust systems in the deep learning and big data era. The principle is to collect as much data possible such that the collected data can better approach the real data distribution. Looking further into the data collection process, the most challenging part is to generate precisely annotated data which are mandatory for supervised/semi-supervised learning methods. Since the quality of annotations impacts the performance of a learned model, people still consider intensive human visual checking and manual annotating as the gold standard, which can take months and even years to reach an appropriate amount before starting training.

SUMMARY OF THE INVENTION

Fast visual data annotation includes automatic detection using an automatic detector to detect subjects and joints in video frames. Then, annotation with sampling is performed, including determining when a frame is a sample (e.g., based on comparison of frames). Replay and refinement is utilized where user is involved with manually annotating subjects and/or joints in only select video frames.

In one aspect, a method comprises receiving video content on a device, processing the video content with an automatic detector by the device and performing a two-step manual target subject keeping and tuning. The automatic detector is configured to detect one or more subjects and one or more joints within the video content. The two-step manual target subject keeping and tuning comprises selecting samples of the video content to manually review, wherein the samples are frames selected based on a difference amount between one or more joints of a first frame and a second frame, and interpolating joint information for non-selected frames. The two-step manual target subject keeping and tuning utilizes a graphical user interface and a limited set of operations. The limited set of operations include using only a spacebar and mouse buttons. A cursor is automatically moved to a next subject or joint based on a current subject or joint. The method further comprises outputting annotations of final joint positions and a bounding box around each of the one or more subjects.

In another aspect, an apparatus comprises a non-transitory memory for storing an application, the application for: receiving video content, processing the video content with an automatic detector and receiving input for performing a two-step manual target subject keeping and tuning and a processor coupled to the memory, the processor configured for processing the application. The automatic detector is configured to detect one or more subjects and one or more joints within the video content. The two-step manual target subject keeping and tuning comprises selecting samples of the video content to manually review, wherein the samples are frames selected based on a difference amount between one or more joints of a first frame and a second frame, and interpolating joint information for non-selected frames. The two-step manual target subject keeping and tuning utilizes a graphical user interface and a limited set of operations. The limited set of operations include using only a spacebar and mouse buttons. A cursor is automatically moved to a next subject or joint based on a current subject or joint. The application is further configured for outputting annotations of final joint positions and a bounding box around each of the one or more subjects.

In another aspect, a system comprises a first device for: receiving video content, processing the video content with an automatic detector and a second device for: receiving input for performing a two-step manual target subject keeping and tuning. The automatic detector is configured to detect one or more subjects and one or more joints within the video content. The two-step manual target subject keeping and tuning comprises selecting samples of the video content to manually review, wherein the samples are frames selected based on a difference amount between one or more joints of a first frame and a second frame, and interpolating joint information for non-selected frames. The two-step manual target subject keeping and tuning utilizes a graphical user interface and a limited set of operations. The limited set of operations include using only a spacebar and mouse buttons. A cursor is automatically moved to a next subject or joint based on a current subject or joint. The second device is further for outputting annotations of final joint positions and a bounding box around each of the one or more subjects.

BRIEF DESCRIPTION OF THE DRAWINGS

FIG. 5 illustrates an exemplary diagram of annotation with sampling according to some embodiments.

FIG. 6 illustrates examples of backward and forward interpolation according to some embodiments.

DETAILED DESCRIPTION OF THE PREFERRED EMBODIMENT

A semi-automatic framework to accelerate a high quality annotation process is described herein. More specifically, the data includes videos/images which heavily use human checking and decisions. The scope of annotation tasks (e.g., to annotate faces) is that each individual annotation (e.g., a face) is able to be formulated as a bounding box or a finite set of keypoints. An exemplary implementation of the annotations, but not limited to, is the full human body pose including a bounding box and a set of keypoints (joint positions) for each human subject.

Since a single image is able to be considered as a subset of a video, video data is the focus described herein. The framework comprises a sequence of three jobs:

(1) Automatic annotator, which is a detection algorithm to generate most annotations automatically but with limited accuracy (e.g., the resultant annotations may contain errors such as inaccurate annotations, false positives, and false negatives, and in an exemplary task, this is able to be under 30%).

(2) Sampling, which is an algorithm to suggest the next video frame 'FORWARDINGLY' in time containing inaccurate annotations of subject(s) generated by (1). The annotator is asked to manually correct the annotations of those specific subjects in the suggested frame. The corrected annotations of a subject in a frame is called a 'sample.' In addition, between the currently sampled and the previously sampled annotations, 'BACKWARD' interpolation is performed to update the annotations of these subjects in between.

(3) Refinement, which is to correct annotations at 'ANY' frame after sampling. A corrected subject in this job is also considered as a sample so it can be used for both 'FORWARD AND BACKWARD' interpolation in time.

Experiments have shown that fast visual data annotation is able to be five times faster than a traditional, fully manual video annotation method, while the final annotated keypoints are spatially as precise and the trajectories of all keypoints are temporally smoother than purely manual annotations.

Figure 1:
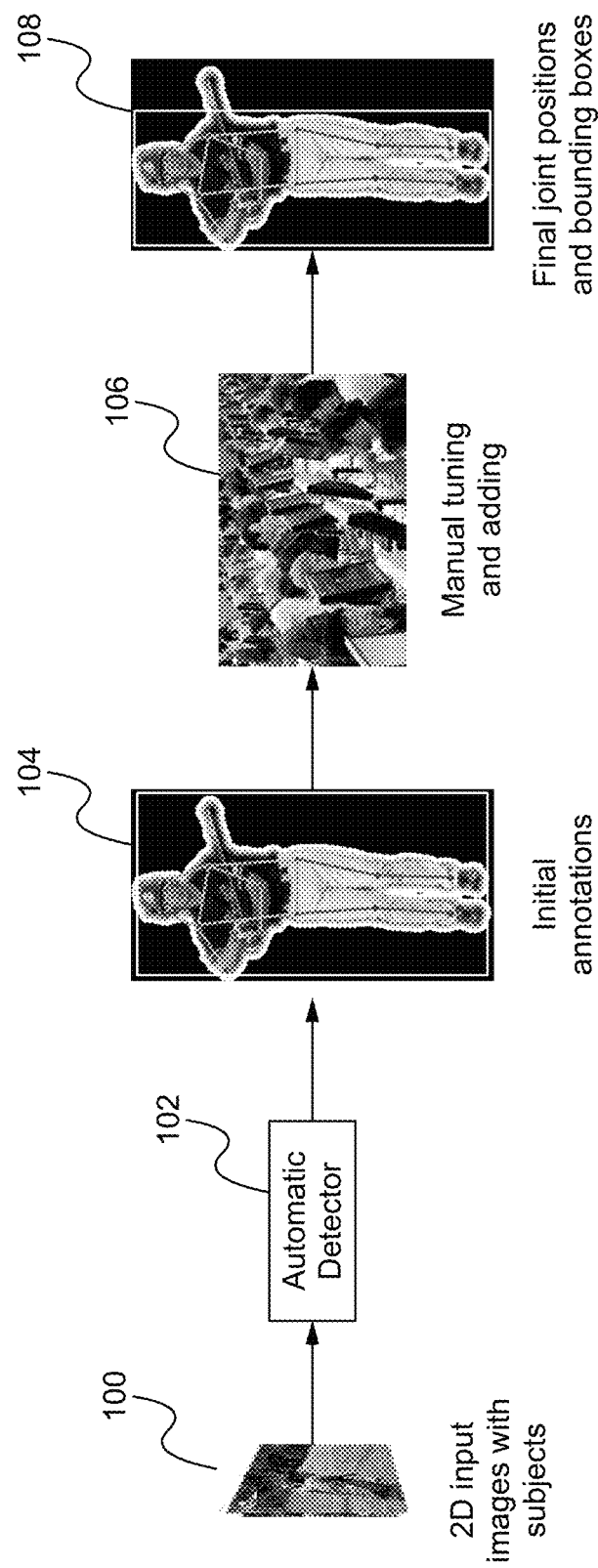
FIG. 1 illustrates a flowchart of a method of fast visual data annotation of images according to some embodiments.

FIG. 1 illustrates a flowchart of a method of fast visual data annotation of images according to some embodiments. In the step 100, 2D image input with subjects is received. The 2D images contain any number of subjects, and the subjects are able to be occluded or not, at any size, and with any number of visible joints. In the step 102, the 2D input is processed by an automatic detector. The processing by the automatic detector includes automatically performing initial annotations 104. For example, the automatic detector detects targets and joints for each target automatically. The targets are able to be detected automatically in any manner, such as an image processing algorithm which uses templates to detect and match specified shapes (e.g., human shapes, animal shapes). The joints are able to be detected automatically in any manner, such as an image processing algorithm which uses templates to detect facial components such as eyes, nose and mouth, and image analysis such as detecting bends of body parts (e.g., an arm is two straight lines with a bend at the elbow/joint) or body part template matching. In the step 106, manual tuning and adding is performed. For example, a user manually reviews the automatically generated annotations to verify and correct the annotations. If any annotations were missed by the automatic generator, the user is able to manually generate annotations (including targets and joints). In some embodiments, manual analysis/tuning utilizes a specific Graphical User Interface (GUI) and/or a limited set of operations. For example, the spacebar of a keyboard is used to confirm selections/positioning and to go to the next step, a left mouse click makes selections/positioning, and a right mouse click deletes. In another example, the user presses the spacebar when the displayed results are accurate, clicks the left mouse button when the results are inaccurate, and clicks the right mouse button when the results are fake. In some embodiments, other keyboard/mouse/input selections are able to be used. For example, voice input is able to be used such as: "confirm," "position" and "delete." In some embodiments, the cursor is automatically moved according to the current annotating item (e.g., nose), which is able to be based on the automatic detection. This leads to a very small visually search area instead of the whole image, which leads to shorter decision time. In the step 108, final joint positions and bounding boxes are determined/established/output. The annotations based on the automatic detector and the manual editor/verifier are saved (e.g., in a data file/table/structure). Annotation of all visually judgeable joints and subject bounding boxes in the image is output. In some embodiments, fewer or additional steps are implemented. In some embodiments, the order of the steps is modified.

Figure 2:
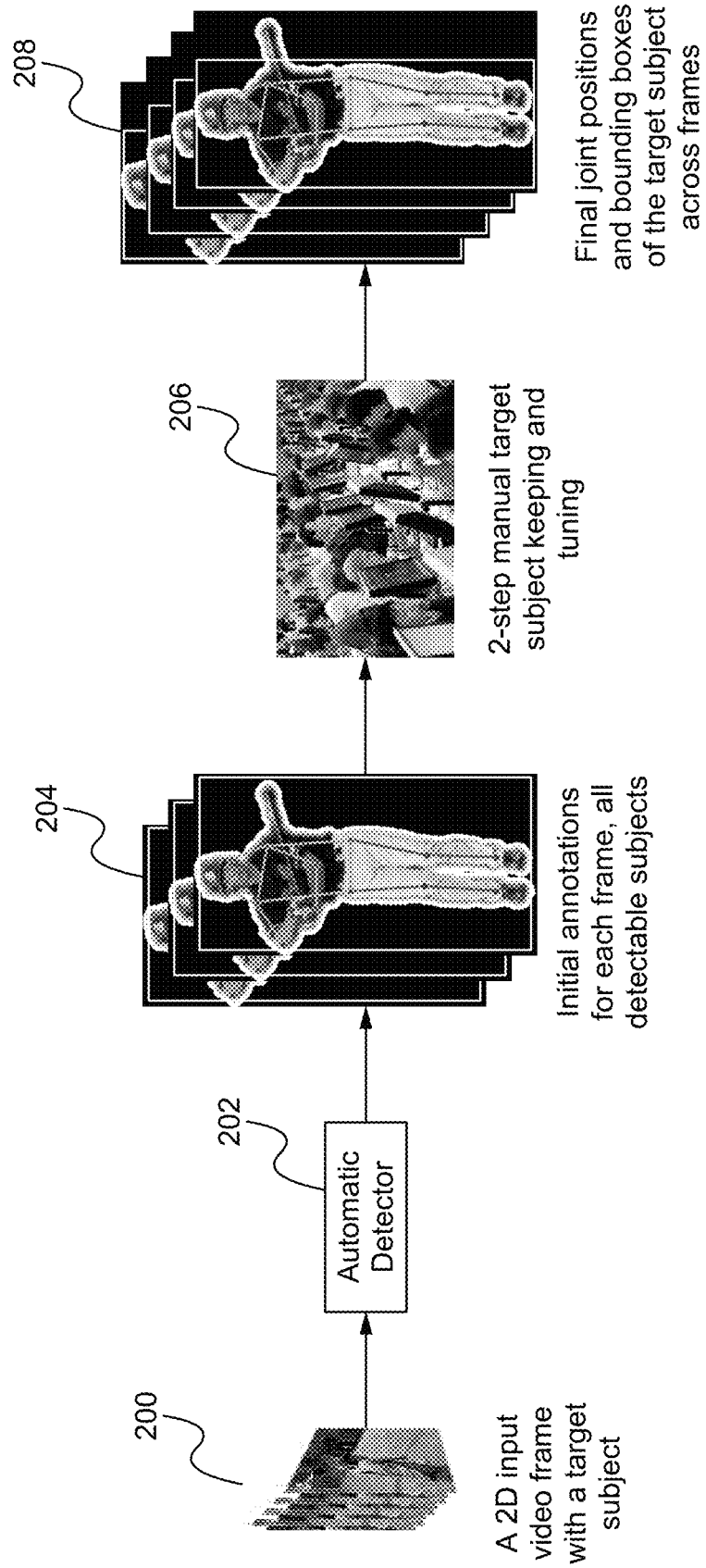
FIG. 2 illustrates a flowchart of a method of fast visual data annotation of video content according to some embodiments.

FIG. 2 illustrates a flowchart of a method of fast visual data annotation of video content according to some embodiments. In the step 200, 2D video frame input with subjects is received. The 2D video frames contain any number of subjects, and the subjects are able to be occluded or not, at any size, and with any number of visible joints.

In the step 202, the 2D input is processed by an automatic detector. The processing by the automatic detector includes automatically performing initial annotations 204 for each frame. For example, the automatic detector detects targets and joints for each target automatically. The targets are able to be detected automatically in any manner, such as an image processing algorithm which uses templates to detect and match specified shapes (e.g., human shapes, animal shapes). The joints are able to be detected automatically in any manner, such as an image processing algorithm which uses templates to detect facial components such as eyes, nose and mouth, and image analysis such as detecting bends of body parts (e.g., an arm is two straight lines with a bend at the elbow/joint) or body part template matching.

In the step 206, 2-step manual target subject keeping and tuning is performed. In some embodiments, manual analysis/tuning utilizes a specific Graphical User Interface (GUI) and/or a limited set of operations. For example, the spacebar of a keyboard is used to confirm selections/positioning and to go to the next step, a left mouse click makes selections/positioning, and a right mouse click deletes. In another example, the user presses the spacebar when the displayed results are accurate, clicks the left mouse button when the results are inaccurate, and clicks the right mouse button when the results are fake. In some embodiments, other keyboard/mouse/input selections are able to be used. For example, voice input is able to be used such as: "confirm," "position" and "delete." In some embodiments, the cursor is automatically moved according to the current annotating item (e.g., nose), which is able to be based on the automatic detection. This leads to a very small visually search area instead of the whole image, which leads to shorter decision time.

In some embodiments, sampling is utilized to reduce the number of frames to be analyzed. For example, instead of performing manual target subject keeping and tuning on all of the frames, only a percentage of the frames are utilized (e.g., 10%, 25%, 50%). The frames are able to be selected for sampling in any manner such as randomly, a set number of frames between each sample (e.g., 20), and/or based on the automatic detector results (e.g., automatic detector found a number of subjects and/or joints above or below a threshold, or a difference between frames is above or below a threshold). For the frames between the selected frames, interpolation is used as described herein. For example, linear interpolation is able to go from a sample at $T_1$ to the next frame. The next frame position is able to be compared (as detected by the automatic detector/auto-notator) with the linear prediction, and if the difference is large (e.g., above a threshold), then there is a bigger change in the trajectory of the joint than expected or the joint has disappeared, appeared, or was wrong (e.g., false detection). In some embodiments, when the difference is above the threshold, then a human is alerted to make a final decision as to whether a subject or joint is there and the correct location of it. In other words, a frame with a difference above the threshold is indicated/marked as a sample. In some embodiments, the user does not review each frame, only those frames where the difference is larger than the threshold, and interpolation is able to be used for the other frames.

In the step 208, final joint positions and bounding boxes are determined/established/output. The annotations based on the automatic detector and the manual editor/verifier are saved (e.g., in a data file/table/structure). Annotation of all visually judgeable joints and subject bounding boxes in the image is output. In some embodiments, fewer or additional steps are implemented. In some embodiments, the order of the steps is modified.

In some embodiments, the automated processing and/or the manual target tracking are augmented by additional automated analysis/processing.

Figure 3:
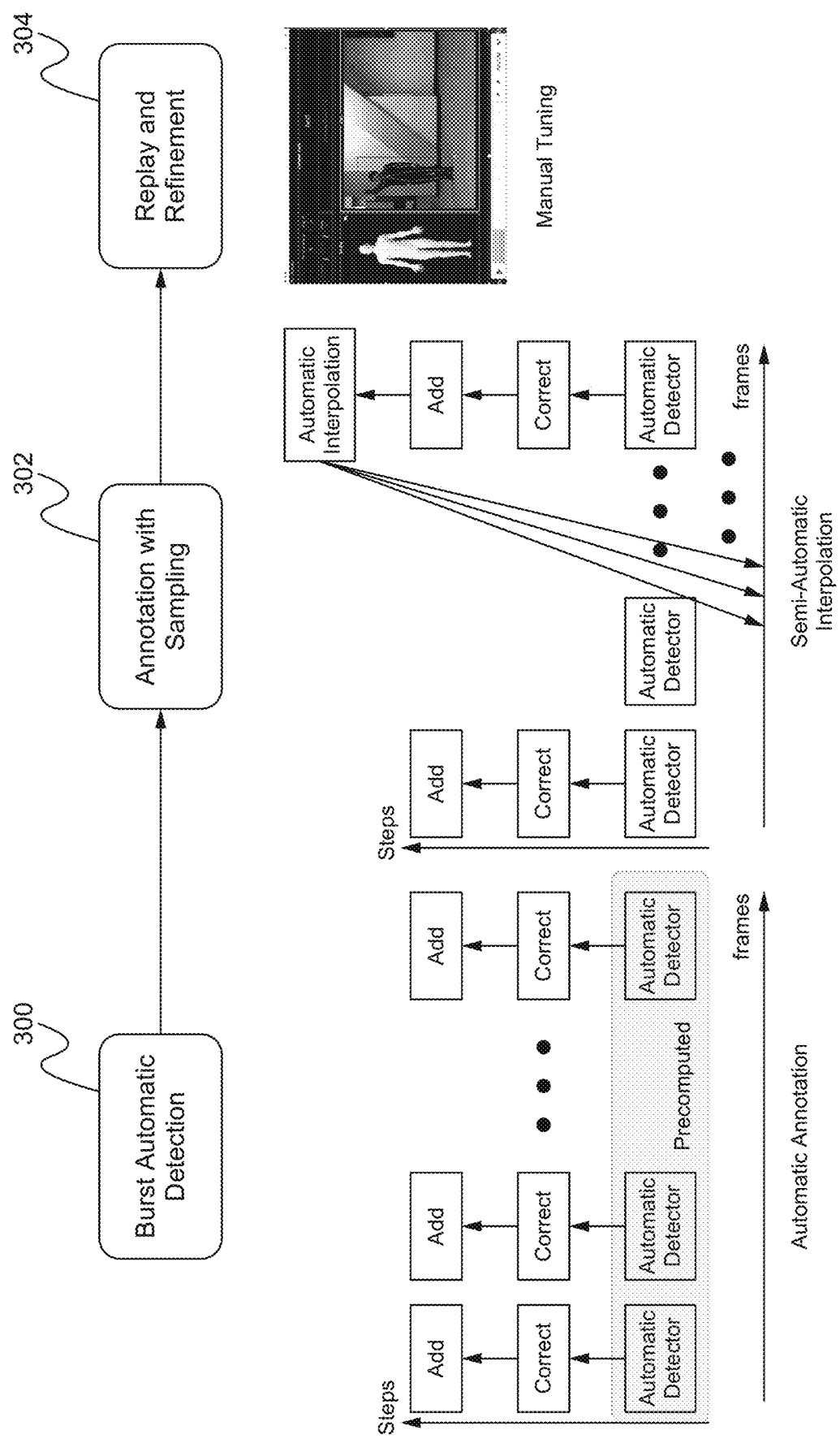
FIG. 3 illustrates a flowchart of a method of video annotation according to some embodiments.

FIG. 3 illustrates a flowchart of a method of video annotation according to some embodiments. In the step 300, burst automatic detection is implemented, where all video frames are detected at once. Multi-video input (burst) is supported. No human action is used during the detection. In the step 302, annotation with sampling is performed. In the step 304, replay and refinement is utilized. In some embodiments, fewer or additional steps are implemented. In some embodiments, the order of the steps is modified.

For annotation with sampling, a next sample in time of a subject is chosen automatically (referred to as adaptive sampling). In some embodiments, numerical extrapolation is implemented. Frame 0 and 1 are sampled to be able to perform extrapolation. To determine the next sample from the current sample at $t_0$, the process considers t ($t>t_0$) as the next sample if one of the following is satisfied at any keypoint:

1) OKS (detection(t), extrapolated ($t_0$, t))<0.5, where this is a measure of location difference between the detected and the extrapolated keypoints;

2) Any keypoint appears at detection(t), but was invisible at $t_0$;

3) Any keypoint disappears at detection(t), but was visible at $t_0$.

In some embodiments, learning a confidence regressor is implemented including learning an OKS regressor for each keypoint type given the automatic detector and an input image. Learning includes training and inference.

Figure 4:
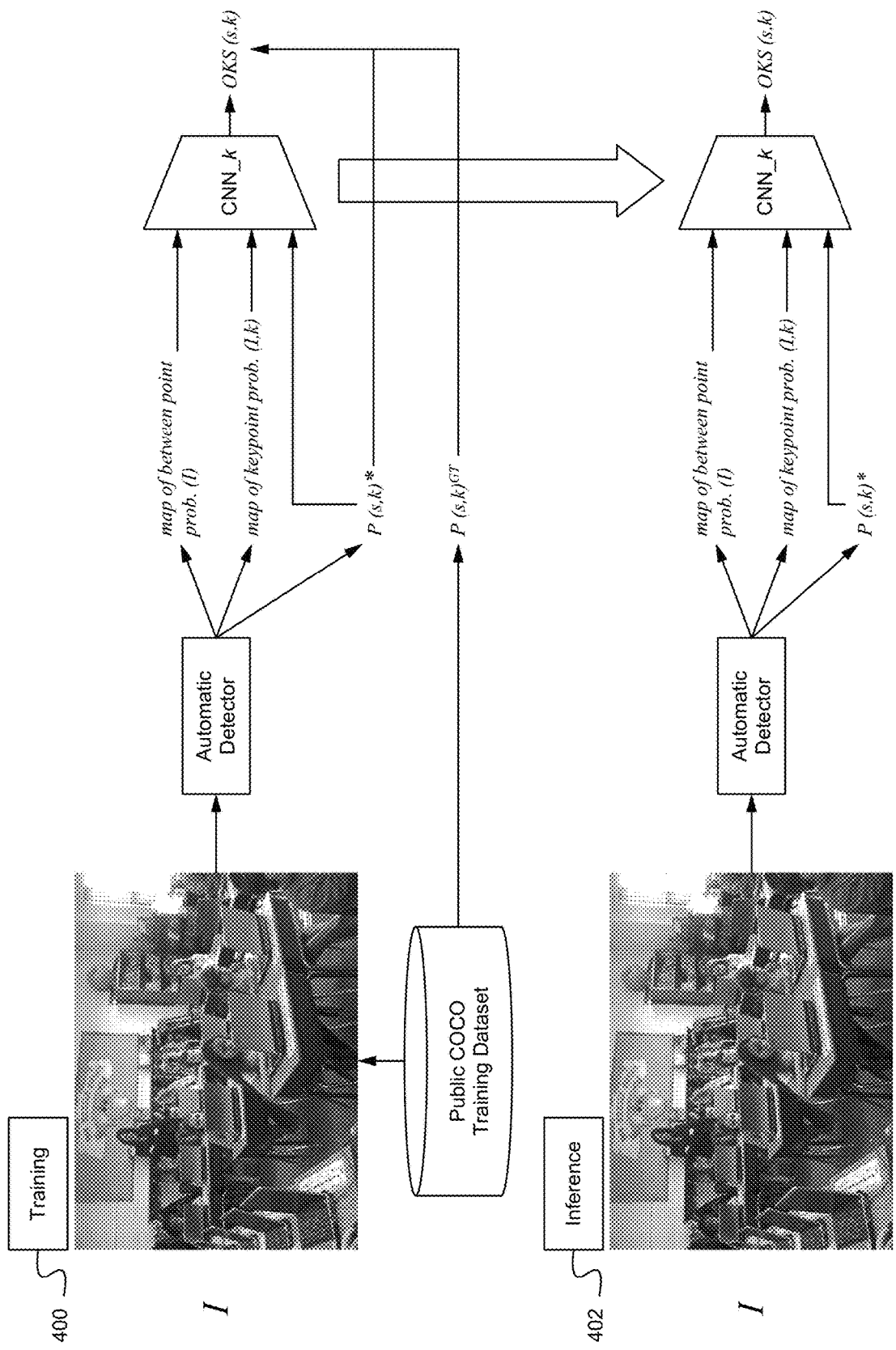
FIG. 4 illustrates a diagram of learning a confidence regressor according to some embodiments.

FIG. 4 illustrates a diagram of learning a confidence regressor according to some embodiments. In the step 400, training is performed. For each keypoint type k belonging, given the ground truth keypoint position $P(s,k)^{GT}$ for each subject s: an input frame (from a public training dataset) goes to an automatic detector which performs keypoint detection to generate $P(s,k)^*$, and all the training images, the detected $P(s,k)^*$'s, and the computed OKS(s,k) by $P(s,k)_{GT}$ and $P(s,k)^*$, are used to train a convolutional neural network (CNN) to regress OKS(s,k) automatically. In the step 402, an inference is determined. For each detected keypoint position $P(s,k)^*$, an input frame goes to an automatic detector which performs mapping b and the data goes to a convolutional neural network to generate OKS(s,k).

To determine the next sample from the current sample at $t_0$, it is considered t ($t>t_0$) as the next sample if one of the following is satisfied at any keypoint. OKS<0.5, any keypoint appears at detection (t), but was invisible at $t_0$; any keypoint disappears at detection (t), but was visible at $t_0$.

The frames are sampled where any subject is to be sampled. Reversely, a sampled frame may have multiple subjects that could use a sample. In some embodiments, for a sampled frame, the annotator suggests only subjects requiring a sample instead of all subjects in a frame.

FIG. 5 illustrates an exemplary diagram of annotation with sampling according to some embodiments.

For replay and refinement, visual playing, checking and tuning is performed to determine spatial per-frame correctness and temporal smoothness. In some embodiments, interpolation from samples is performed in annotation with sampling and replay and refinement. As long as the annotation was done manually by the annotator, it is able to be considered as a "sample," which provides accurate data for interpolation.

FIG. 6 illustrates examples of backward and forward interpolation according to some embodiments.

In some embodiments, for video operation, the spacebar is used to confirm selections/positioning and to go to a next step; 4 arrow keys are used to control the playing of the current video annotations; and the "end" key is used to end the play/refinement of the current video annotations. A left click of the mouse is to make selections/positioning, and a right click is to delete or none (no need of confirmation). Other controls (e.g., voice) are able to be implemented.

In a distributed implementation of video annotation, automatic detection is able to be performed on a few machines each with a GPU, and then sampling and refinement by crowdsourcing is able to be performed on ordinary devices (e.g., during work hours).

Figure 7:
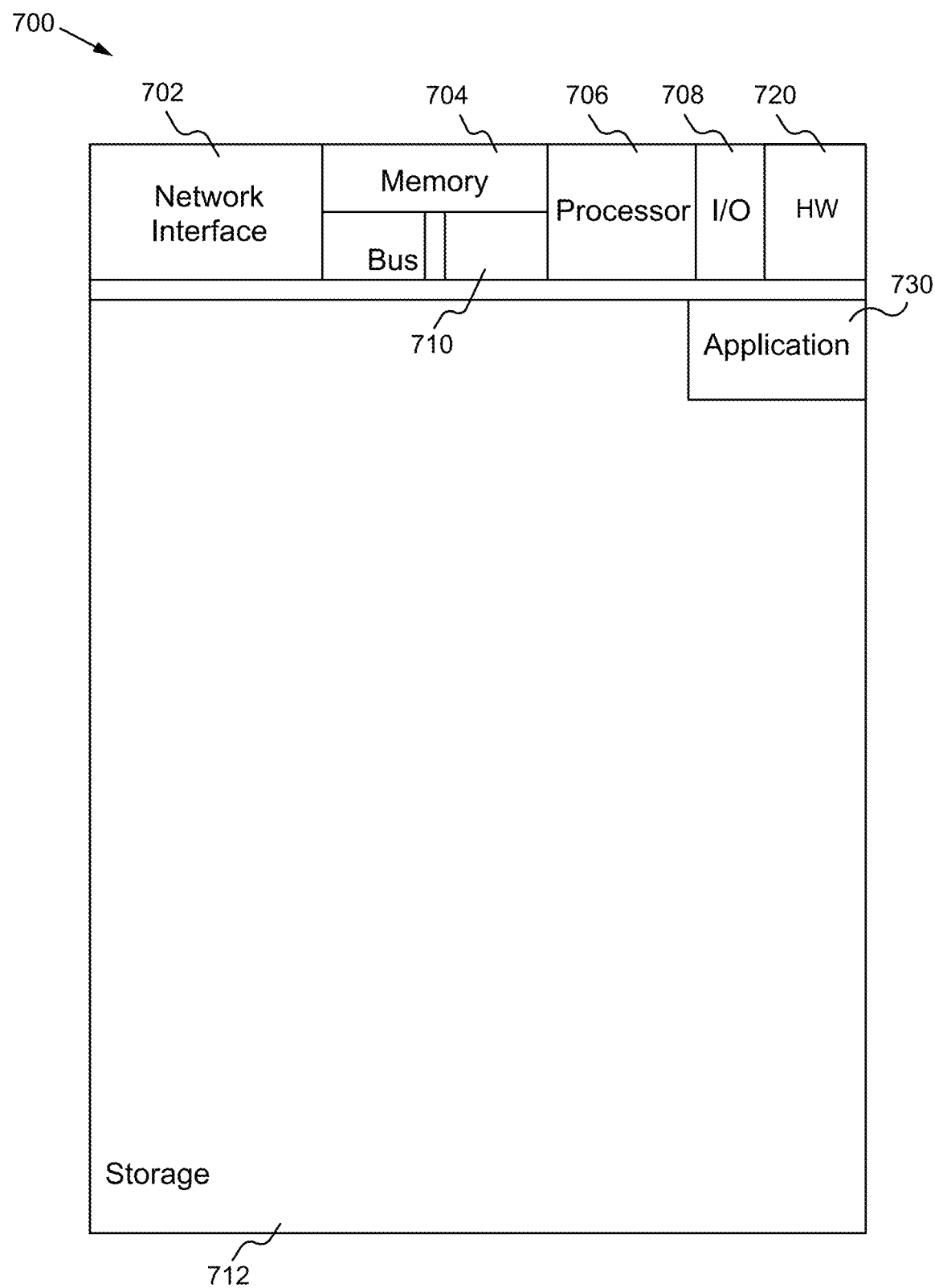
FIG. 7 illustrates a block diagram of an exemplary computing device configured to implement the fast visual data annotation method according to some embodiments.

FIG. 7 illustrates a block diagram of an exemplary computing device configured to implement the fast visual data annotation method according to some embodiments. The computing device 700 is able to be used to acquire, store, compute, process, communicate and/or display information such as images and videos. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Fast visual data annotation application(s) 730 used to implement the fast visual data annotation method are likely to be stored in the storage device 712 and memory 704 and processed as applications are typically processed. More or fewer components shown in FIG. 7 are able to be included in the computing device 700. In some embodiments, fast visual data annotation hardware 720 is included. Although the computing device 700 in FIG. 7 includes applications 730 and hardware 720 for the fast visual data annotation method, the fast visual data annotation method is able to be implemented on a computing device in hardware, firmware, software or any combination thereof. For example, in some embodiments, the fast visual data annotation applications 730 are programmed in a memory and executed using a processor. In another example, in some embodiments, the fast visual data annotation hardware 720 is programmed hardware logic including gates specifically designed to implement the fast visual data annotation method.

In some embodiments, the fast visual data annotation application(s) 730 include several applications and/or modules. In some embodiments, modules include one or more sub-modules as well. In some embodiments, fewer or additional modules are able to be included.

In some embodiments, the fast visual data annotation hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 8:
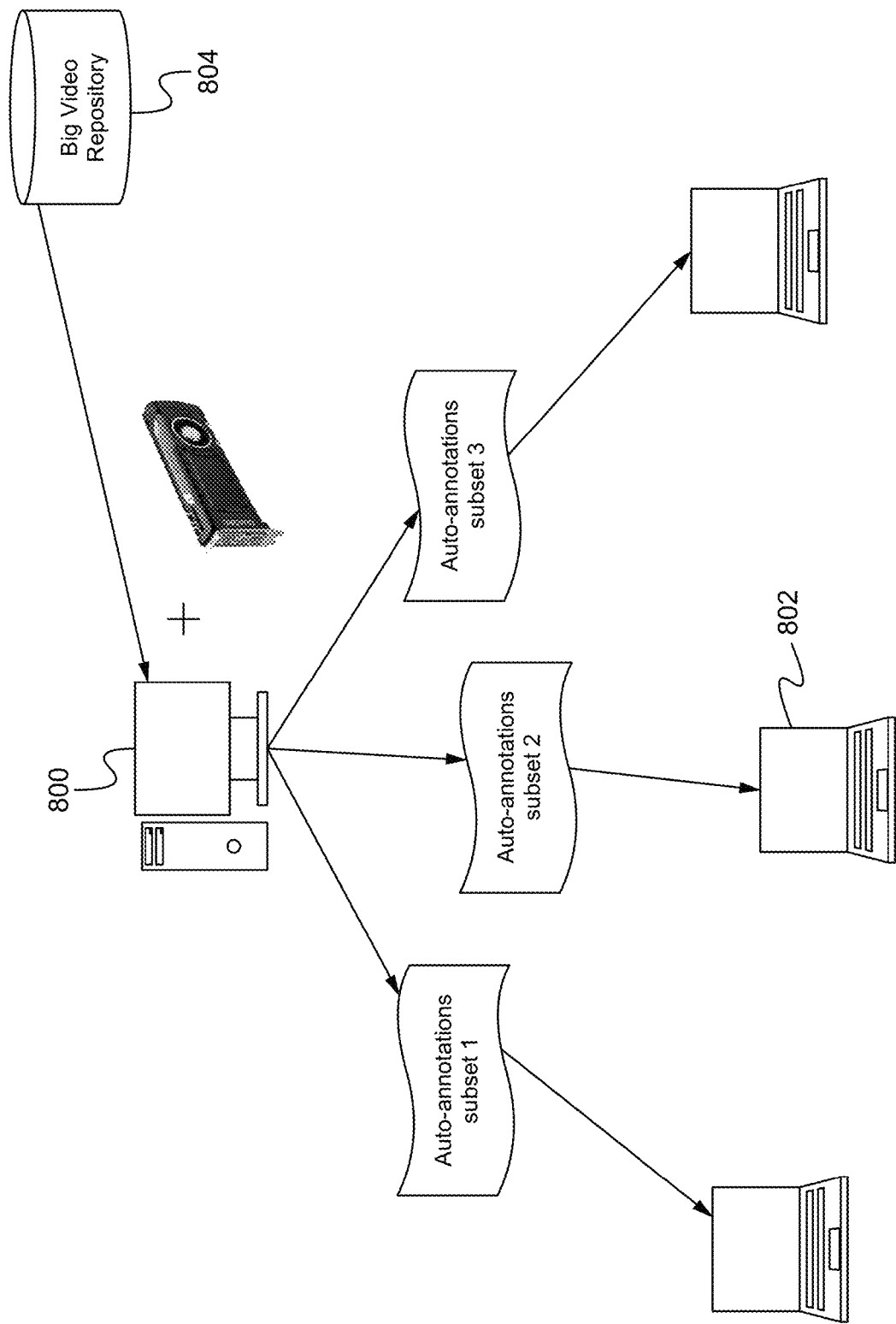
FIG. 8 illustrates a diagram of a distributed scenario of video annotation according to some embodiments.

FIG. 8 illustrates a diagram of a distributed scenario of video annotation according to some embodiments. Automatic detection is performed on high powered GPU (or other processor) machines 800. Standard devices 802 (e.g., laptops, personal computers, or other user-end devices) are able to be used for sampling and refinement. A large video repository 804 stores the video content to be annotated.

To utilize the fast visual data annotation method, a device acquires or receives image/video content and processes the content in an optimized manner to enable proper, efficient annotation of the content. The fast visual data annotation method is able to be implemented with limited user assistance.

In operation, the fast visual data annotation has several novelties such as:

(1) Utilizing an automatic detector to initialize annotations so any inconsistency due to different annotators could be reduced, and to decrease the per-frame manual operations because the accurate automatic annotations are able to be skipped;

(2) The three per-frame manual annotation operations which minimize task switching and reduce fatigue;

(3) The 'SEMI-AUTOMATIC' annotation job sequence which integrates the 'AUTOMATIC' detection+sampling/interpolation with 'MANUAL' annotation. The 3 sequential jobs reduce the frequency of per-image manual operations to just a few sampled frames and produce spatial-temporally more accurate annotations than pure manual annotations;

(4) The two forward sample selection methods for automatic annotations, one is numerical extrapolation and the other is a learning-based confidence regressor. Both are able to determine the next sample at run time and are feasible for streaming processing; and (5) The sequential 3-job framework is separable and scalable. One is able to use a few premium workstations with good (e.g., above a specified threshold) GPUs to do automatic annotations 7/24, while the sampling and the refinement is able to be done by crowdsourcing using basic devices during normal work hours.

The fast visual data annotation method is 5× faster than fully manual video annotation due to sampling and interpolation, while visually undiscernable from fully manual annotations. The fast visual data annotation method provides more consistent annotations (e.g., keypoint trajectories are smoothed by sampling and interpolation). The fast visual data annotation method is highly scalable where the automatic pose estimator is able to work all day long, every day, and crowdsourced annotators are able to work distributedly using low cost devices.

In some embodiments, the fast visual data annotation method described herein is performed using 3D images/video content.

Some Embodiments of Method for Fast Visual Data Annotation

1. A method comprising:
    receiving video content on a device;
    processing the video content with an automatic detector by the device; and
    performing a two-step manual target subject keeping and tuning.
2. The method of clause 1 wherein the automatic detector is configured to detect one or more subjects and one or more joints within the video content.
3. The method of clause 1 wherein the two-step manual target subject keeping and tuning comprises selecting samples of the video content to manually review, wherein the samples are frames selected based on a difference amount between one or more joints of a first frame and a second frame, and interpolating joint information for non-selected frames.
4. The method of clause 1 wherein the two-step manual target subject keeping and tuning utilizes a graphical user interface and a limited set of operations.
5. The method of clause 4 wherein the limited set of operations include using only a spacebar and mouse buttons.
6. The method of clause 2 wherein a cursor is automatically moved to a next subject or joint based on a current subject or joint.
7. The method of clause 2 further comprising outputting annotations of final joint positions and a bounding box around each of the one or more subjects.
8. An apparatus comprising:
    a non-transitory memory for storing an application, the application for:
        receiving video content;
        processing the video content with an automatic detector; and
        receiving input for performing a two-step manual target subject keeping and tuning; and
    a processor coupled to the memory, the processor configured for processing the application.
9. The apparatus of clause 8 wherein the automatic detector is configured to detect one or more subjects and one or more joints within the video content.
10. The apparatus of clause 8 wherein the two-step manual target subject keeping and tuning comprises selecting samples of the video content to manually review, wherein the samples are frames selected based on a difference amount between one or more joints of a first frame and a second frame, and interpolating joint information for non-selected frames.
11. The apparatus of clause 8 wherein the two-step manual target subject keeping and tuning utilizes a graphical user interface and a limited set of operations.
12. The apparatus of clause 11 wherein the limited set of operations include using only a spacebar and mouse buttons.
13. The apparatus of clause 9 wherein a cursor is automatically moved to a next subject or joint based on a current subject or joint.

14. The apparatus of clause 9 wherein the application is further configured for outputting annotations of final joint positions and a bounding box around each of the one or more subjects.
15. A system comprising:
    a first device for:
        receiving video content;
        processing the video content with an automatic detector; and
    a second device for:
        receiving input for performing a two-step manual target subject keeping and tuning.
16. The system of clause 15 wherein the automatic detector is configured to detect one or more subjects and one or more joints within the video content.
17. The system of clause 15 wherein the two-step manual target subject keeping and tuning comprises selecting samples of the video content to manually review, wherein the samples are frames selected based on a difference amount between one or more joints of a first frame and a second frame, and interpolating joint information for non-selected frames.
18. The system of clause 15 wherein the two-step manual target subject keeping and tuning utilizes a graphical user interface and a limited set of operations.
19. The system of clause 18 wherein the limited set of operations include using only a spacebar and mouse buttons.
20. The system of clause 16 wherein a cursor is automatically moved to a next subject or joint based on a current subject or joint.
21. The system of clause 16 wherein the second device is further for outputting annotations of final joint positions and a bounding box around each of the one or more subjects.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
    receiving video content on a device;
    processing the video content with an automatic detector by the device, wherein the automatic detector is configured to detect one or more subjects and one or more joints within the video content, wherein the one or more subjects are detected using a first image processing algorithm which utilizes a first set of templates to detect and match specified shapes, and wherein the one or more joints are detected using a second image processing algorithm which utilizes a second set of templates to detect facial components; and
    performing a two-step manual target subject keeping and tuning, wherein the two-step manual target subject keeping and tuning comprises selecting samples of the video content to manually review, wherein the samples are frames selected based on a difference amount between one or more joints of a first frame and a second frame, and interpolating joint information for non-selected frames.
2. The method of claim 1 wherein the two-step manual target subject keeping and tuning utilizes a graphical user interface and a limited set of operations.
3. The method of claim 2 wherein the limited set of operations include using only a spacebar and mouse buttons.
4. The method of claim 1 wherein a cursor is automatically moved to a next subject or joint based on a current subject or joint.
5. The method of claim 1 further comprising outputting annotations of final joint positions and a bounding box around each of the one or more subjects.
6. An apparatus comprising:
    a non-transitory memory for storing an application, the application for:
        receiving video content;
        processing the video content with an automatic detector, wherein the automatic detector is configured to detect one or more subjects and one or more joints within the video content, wherein the one or more subjects are detected using a first image processing algorithm which utilizes a first set of templates to detect and match specified shapes, and wherein the one or more joints are detected using a second image processing algorithm which utilizes a second set of templates to detect facial components; and
        receiving input for performing a two-step manual target subject keeping and tuning, wherein the two-step manual target subject keeping and tuning comprises selecting samples of the video content to manually review, wherein the samples are frames selected based on a difference amount between one or more joints of a first frame and a second frame, and interpolating joint information for non-selected frames; and
    a processor coupled to the memory, the processor configured for processing the application.
7. The apparatus of claim 6 wherein the two-step manual target subject keeping and tuning utilizes a graphical user interface and a limited set of operations.
8. The apparatus of claim 7 wherein the limited set of operations include using only a spacebar and mouse buttons.
9. The apparatus of claim 6 wherein a cursor is automatically moved to a next subject or joint based on a current subject or joint.
10. The apparatus of claim 6 wherein the application is further configured for outputting annotations of final joint positions and a bounding box around each of the one or more subjects.
11. A system comprising:
    a first device for:
        receiving video content;
        processing the video content with an automatic detector, wherein the automatic detector is configured to detect one or more subjects and one or more joints within the video content, wherein the one or more subjects are detected using a first image processing algorithm which utilizes a first set of templates to detect and match specified shapes, and wherein the one or more joints are detected using a second image processing algorithm which utilizes a second set of templates to detect facial components, wherein the one or more joints are detected within the video content by detecting straight lines with a bend connecting the straight lines; and
    a second device for:
        receiving input for performing a two-step manual target subject keeping and tuning, wherein the two-step manual target subject keeping and tuning comprises selecting samples of the video content to manually review, wherein the samples are frames selected based on a difference amount between one or more joints of a first frame and a second frame, wherein the samples are less than 100% of all of the frames, and interpolating joint information for non-selected frames.

12. The system of claim 11 wherein the two-step manual target subject keeping and tuning utilizes a graphical user interface and a limited set of operations.

13. The system of claim 12 wherein the limited set of operations include using only a spacebar and mouse buttons.

14. The system of claim 11 wherein a cursor is automatically moved to a next subject or joint based on a current subject or joint.

15. The system of claim 11 wherein the second device is further for outputting annotations of final joint positions and a bounding box around each of the one or more subjects.

* * * * *